United States Patent [19]

Williams

[11] Patent Number: 5,095,623
[45] Date of Patent: Mar. 17, 1992

[54] MULTIPURPOSE FIREFIGHTING TOOL

[75] Inventor: Charles A. Williams, Sanford, Fla.

[73] Assignee: William Tennyson, Clearwater, Fla.

[21] Appl. No.: 672,728

[22] Filed: Mar. 21, 1991

[51] Int. Cl.⁵ .............................................. B26B 11/00
[52] U.S. Cl. ...................................... 30/144; 30/299; 7/148; 7/158
[58] Field of Search ................. 30/123, 142, 144, 299; 7/100, 145, 158, 159, 148, 170

[56] References Cited

U.S. PATENT DOCUMENTS

| | | | |
|---|---|---|---|
| 598,463 | 2/1898 | Foster | 30/144 |
| 1,390,400 | 9/1921 | Threet | 7/148 |
| 1,561,647 | 11/1925 | Johnson | 7/158 |
| 1,935,149 | 11/1933 | Elvin | 30/123 |
| 2,907,108 | 10/1959 | Nolte, Jr. | 30/123 |
| 3,005,478 | 10/1961 | Laviano | 30/144 |
| 3,495,329 | 2/1970 | Bothe | 7/148 |
| 3,521,353 | 7/1970 | Fabyan | 7/148 |
| 3,837,024 | 9/1974 | Saunders | 7/148 |
| 4,080,734 | 3/1978 | Barbour | 30/123 |
| 4,208,793 | 6/1980 | Sinnott | 30/299 |
| 4,622,707 | 11/1986 | Finn | 7/158 |
| 4,685,213 | 8/1987 | Powers | 30/123 |

Primary Examiner—Frank T. Yost
Assistant Examiner—Hwei-Siu Payer
Attorney, Agent, or Firm—Joseph C. Mason, Jr.; Ronald E. Smith

[57] ABSTRACT

A firefighting tool having a flat blade with a pointed leading end for piercing through structural panels, a plurality of stop teeth members for engaging a structural panel that has been pierced to defeat facile withdrawal of the tool, and a plurality of rip teeth members for sawing through the panels when the tool is reciprocated along its longitudinal axis. The stop teeth members are positioned at an angle relative to the rip teeth members and allow the firefighter to easily maintain the tool in an overhead configuration when it is used to remove ceiling panels because the angle of the stop teeth members results in a hooking action so that the ceiling supports the weight of the tool to some extent. Since the stop teeth members defeat inadvertent withdrawal of the blade, the firefighter need not make multiple penetrations of the ceiling panels or other structural member being removed by the tool.

6 Claims, 3 Drawing Sheets

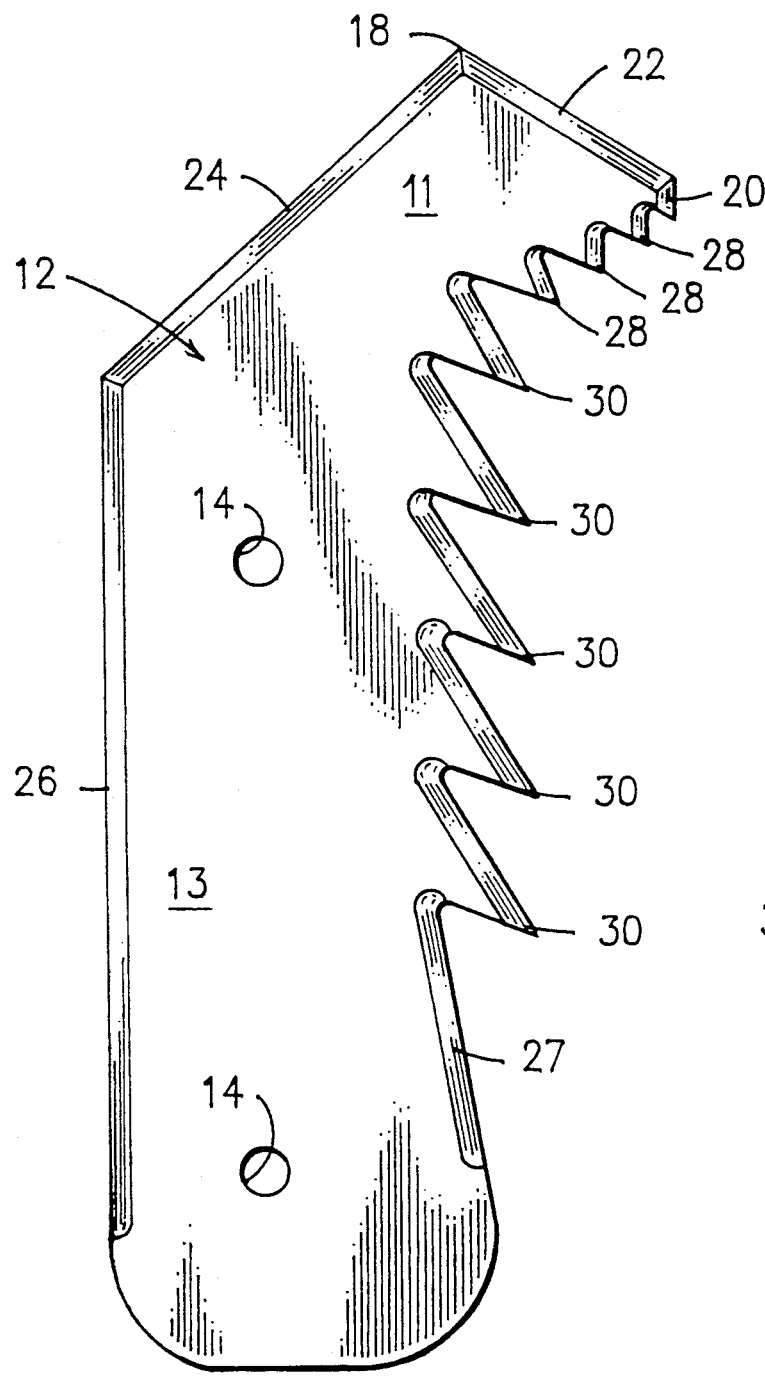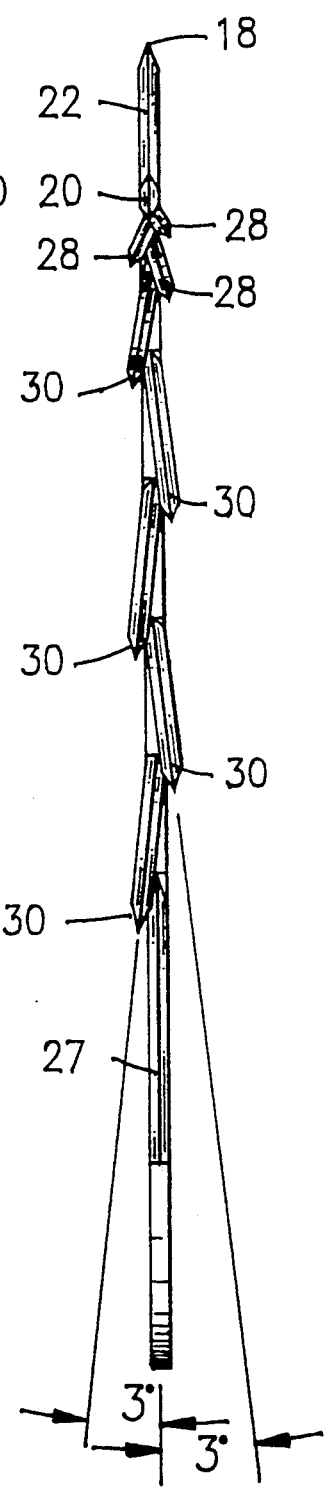
FIG. 2
FIG. 3

MULTIPURPOSE FIREFIGHTING TOOL

TECHNICAL FIELD

This invention relates, generally, to tools used in firefighting. More particularly, it relates to a multi-purpose firefighting tool having utility in the quick removal of ceilings, walls, and other structural panels to enable firefighters to gain quick access to a fire.

BACKGROUND ART

Effective fire fighting requires that the fire be attacked at its source. Thus, where an attic is burning, for example, the firefighter must gain access to the attic so that the appropriate substance may be applied to the fire. Traditionally, firefighters have used a combination tool known as the pike hook to pull ceiling materials out of the way to gain access to fires in spaces above the firefighter. That tool also has utility in the removal of walls, floors, vehicular panels, and other items. The pike hook includes an elongate handle having a longitudinally extending metallic pointed member or pike at its distal end, and a transversely extending metallic hook member integrally formed therewith. The pike part of the tool is used to punch through the drywall, plaster, or other structural material blocking access to the fire, and the hook part of the tool is employed to pull the material down or out and out of the way after it has been pierced by the pike member.

The pike hook has utility because it performs its intended function, but it has shortcomings. For example, it is inefficient at removing ceiling materials because the firefighter must repeatedly puncture the ceiling before the ceiling material can be brought down with the hook. More specifically, the firefighter often is required to make a series of closely spaced perforations with the pike part of the tool before the hook part thereof can effectively rip out a large section of ceiling to provide access to the fire. The need to puncture the ceiling repeatedly tires the firefighter and slows down the process of gaining access to the fire.

The pike hook can also be used to puncture and remove walls to gain access to a fire, but repeated penetration of the wall is still required. Wall penetration is not as tiring because the firefighter is not holding the tool over his or her head, but the making of the multiple punctures required before the wall section can be removed consumes time and energy.

There are numerous other forcible entry tools available to firefighters, such as axes, mattocks, and the like, but these tools supplement the common pike hook, i.e., they do not replace it. Axes, for example, have little utility in pulling lathe, plaster, and sheet metal from their mounting surfaces and must therefor be used in conjunction with pulling tools. The ability of the common pike hook to both penetrate and pull explains its widespread popularity.

However, there remains a need for a penetration and pulling tool that would enable firefighters to remove structural panels without having to make multiple penetrations thereof, that would not overly tire the firefighter even when the tool is held in an overhead configuration, and that would speed up the panel-removal process. The prior art, when considered as a whole in accordance with the requirements of law, neither teaches nor suggests how such a tool could be provided. Significantly, pike hooks, axes, and the like have been known for a century or more; the conventional wisdom has long been that such tools are the best tools for the job, and that no substantial advances can be made in the art of firefighting forcible entry tools.

DISCLOSURE OF THE INVENTION

The longstanding but heretofore unfulfilled need for a tool capable of penetrating common building materials and pulling said materials from their mounting surfaces in a fast and efficient manner is now provided in the form of a tool having some structural similarity to the common brushhook.

The brushhook is a tool that includes a flat blade member secured to the distal free end of an elongate handle, and it performs the function its name implies, i.e., it has utility in removing underbrush. The blade member is curved at its distal free end and as such forms a hook that engages vines, branches, and other underbrush items. The outer edge of the tool is sharpened so that vines and the like may be chopped. The brushhook is not intended for use by firefighters as a tool for removing structural panels, because its hooked end is rounded and thus is not very suitable for punching through plaster, lathe, and the like; accordingly, it is inferior to an axe or mattock in providing the penetration function. Its hook could be used to penetrate such materials if the tool were swung like a baseball bat or a golf club, but trained firefighters never swing dangerous tools in the smoke and confusion of a fire because of the proximity of other firefighters and building occupants. Just as importantly, the elongate, gentle curvature of the common brushhook does not perform well in the pulling of building materials from their mounts.

The present invention substantially modifies the structure of a conventional brushhook and produces a new firefighting tool, heretofore unknown anywhere in the world. A material-puncturing point is formed at the leading end of the tool, and the gently curved inner edge of the tool is replaced with a series of serrated teeth. The teeth near the leading end of the tool engage the ceiling after it has been punctured by the novel point, and prevent facile retraction of the tool therefrom. Additional teeth aligned parallel to the handle of the tool rip the structural material when the novel tool is reciprocated with a sawing action. Advantageously, the teeth at the leading end of the tool support most of the weight of the tool when it is used in an overhead configuration, thereby relieving the firefighter of the need to support the tool when in that position.

The outer edge of the novel tool, like the brushhook, is sharpened so that said outer edge can be used for chopping and slicing in the event the firefighter is able to swing the tool safely. The sharp outer edge also helps cut away the structural panel pierced by the point of the tool.

An important object of this invention is to provide a firefighting tool capable of quickly penetrating and removing structural panels in the absence of multiple penetrations of such panels.

Another object is to provide a firefighting tool that can be used when held over the head of a firefighter without needlessly tiring the firefighter.

These and other objects, features and advantages of the invention will become apparent as this description proceeds.

The invention accordingly comprises the features of construction, combination of elements, and arrangement of parts that will be exemplified in the construction hereinafter set forth and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which:

FIG. 2 is a front elevational view of a second embodiment thereof;

FIG. 3 is an end elevational view of the second embodiment; and

Similar reference numerals refer to similar parts throughout the several views of the drawings.

BEST MODES FOR CARRYING OUT THE INVENTION

Figure 1:
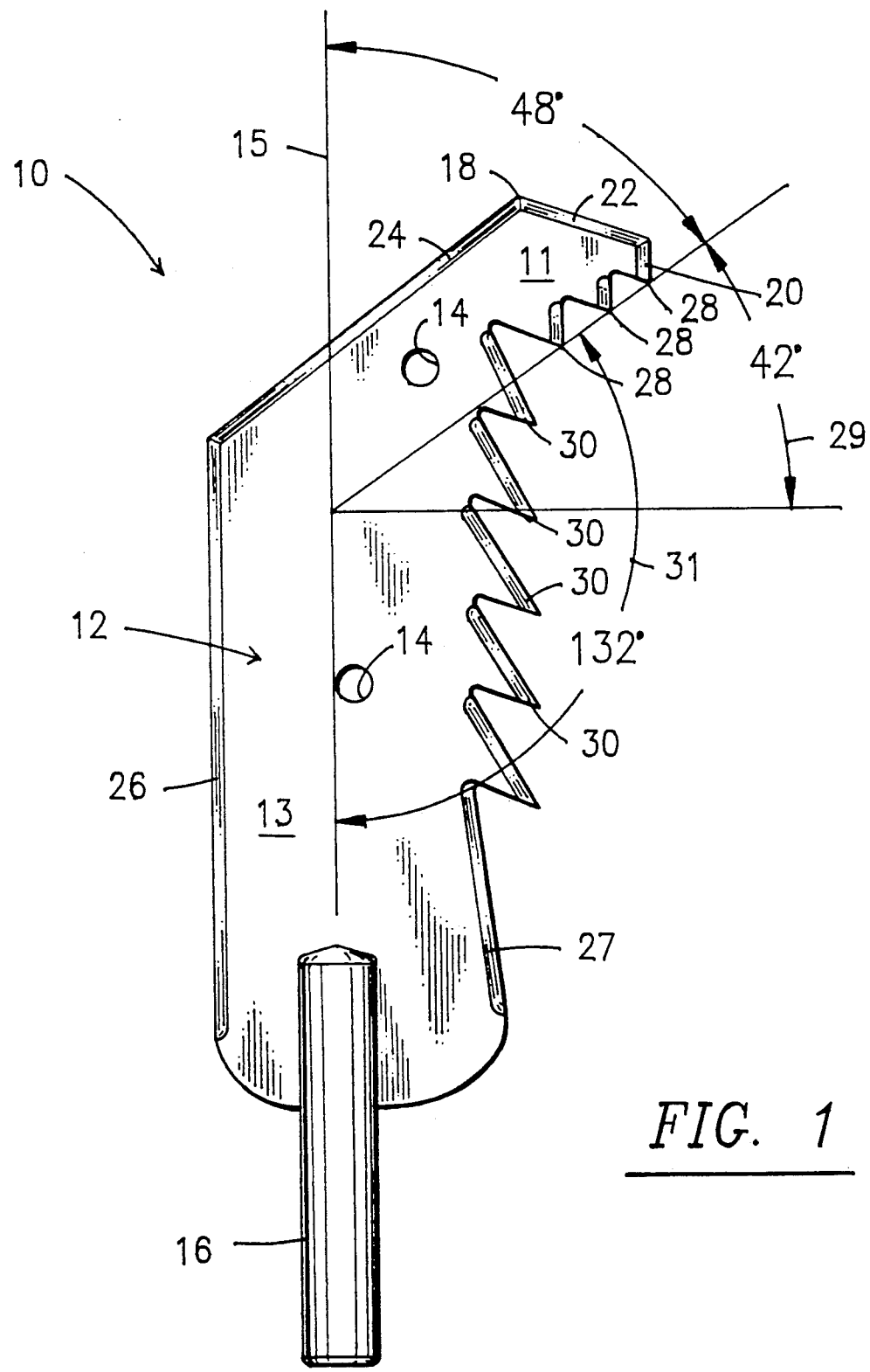
FIG. 1 is a front elevational view of a first exemplary embodiment of the invention.

Referring now to FIG. 1, it will there be seen that an illustrative embodiment of the invention is denoted as a whole by the reference numeral 10.

Tool 10 includes flat blade 12 made of eleven gage spring steel or other suitable material. Blade 12 has a transversely extending part 11 and a longitudinally extending part 13 as depicted. A pair of through apertures, collectively denoted 14, are formed therein at preselected points to provide means for storing the tool when not in use, i.e., holes 14 receive pegs, nails, or other mounting means.

Blade 12 further includes a hollow sleeve 16 formed in its trailing, i.e., proximal, end; sleeve 16 is attachable to an elongate, linear handle 17 (FIG. 14) having a length comparable to that of the common pike hook tool. The handle means, per se, forms no part of the present invention. Handle 17 has longitudinal axis 15.

Piercing point 18 is formed in the leading or distal end of blade 12 as shown; when the tool is in use, the firefighter punctures the ceiling or other structural panel with point 18 as the preliminary step in panel removal; thus, it should be understood that point 18 performs the same function as the pike part of the common pike hook. Significantly, however, the opening made by point 18 is considerably larger than the opening made by the pike hook due to the flat construction of the blade 12. Even more importantly, the opening need be made only once.

Outer knife edges 20, 22, 24, and 26 of blade 12 are sharpened to enable chopping or slicing and to cut the panel being pierced by piercing point 18; edges 22 and 24 flank point 18 and thus complement said point when puncturing the structural panel. Edge 26 could also have serrations formed therein, as could all other knife edges as well. In the claims that follow, edges 22 and 24, collectively, are referred to as the piercing edge of the blade, and edge 26 is referred to as the slicing edge. Note that slicing edge 26 is parallel to longitudinal axis 15, and that an obtuse angle is formed between edges 26 and 24. Note further that edge 24 is disposed at an acute angle with respect to longitudinal axis 15.

Plural teeth, collectively denoted 28, are formed on the inner edge of blade 12 and are angled at a preselected angle 29 relative to a plane orthogonal to the longitudinal axis 15 of handle 17. In other words, the angle 31 between teeth 28 and longitudinal axis 15 is about one hundred thirty two degrees 132°. Teeth 28 engage the upper side of a ceiling panel being removed after piercing point 18 has punctured said panel, and effectively support the weight of the tool when it is in use; accordingly, said teeth are referred to as weight-supporting teeth. Perhaps even more importantly, teeth 28, due to their angular relation with respect to the axis 15 16 as aforesaid, prevent facile retraction of the blade 12 from the ceiling after the initial puncture has been made, as is best understood in connection with FIG. 4. Thus, the firefighter need make but one penetration of the ceiling panel by attacking it with piercing point 18; weight-supporting teeth 28 then ensure that blade 12 will not be withdrawn from the upper side of the ceiling unless intentionally withdrawn by the firefighter.

In the preferred embodiment, there are three weight-supporting teeth 28 as depicted, but empirical studies may reveal a different optimal number of teeth; accordingly, the invention is not restricted to that number. Moreover, the preferred angular relation 29 is about forty two degrees 42°, but, again, the invention is not limited to that particular angle since empirical studies may reveal a different optimal angle.

Rip teeth 30 referred to as saw teeth in the claims, are positioned in parallelism to axis 15 and are preferably larger than weight-supporting teeth 28. They perform the function their name implies, i.e., they rip through the structural material to be removed when tool 10 is reciprocated in a sawing action as indicated by the double-headed directional arrow in FIG. 4. Milled edge 27 just below the lowermost tooth 30 i.e., at the proximal end of the blade, also helps slice through the structural material being removed.

In the embodiment of FIG. 1, weight-supporting teeth 28 and rip teeth 30 are coplanar with one another and with blade 12. These teeth are collectively referred to in the claims as being disposed on the sawing edge of blade 12. Said sawing edge is further identified as being disposed on the second side of the axis 15; slicing edge 26 is defined as being on the first side of said axis and piercing edge 22, 24 is defined as being disposed between said first and second sides of the blade.

FIGS. 2 and 3 depict a second embodiment where the weight-supporting teeth 28 (four in number) and rip teeth 30 are not coplanar with one another; in this embodiment, each tooth member of said sets of teeth is oblique to the plane of blade 12. More particularly, in FIG. 3 the plane of the blade 12 is denoted 17; alternate teeth members are skewed with respect thereto as shown. The angle of skew between each tooth member and plane 17 is common, although contiguous teeth members are skewed in opposite directions as aforesaid and as shown. In the embodiment shown in FIG. 3, the amount of skew is about three degrees 3°, but the invention is not limited to that angle as empirical tests may conclude that a different angle is optimal to perform the function of said skewed stop and rip teeth. As those of ordinary skill in the mechanical arts will appreciate, such skewing enhances the sawing capability of said teeth and that is important because time is often of the essence when the novel tool is in use.

Figure 4:
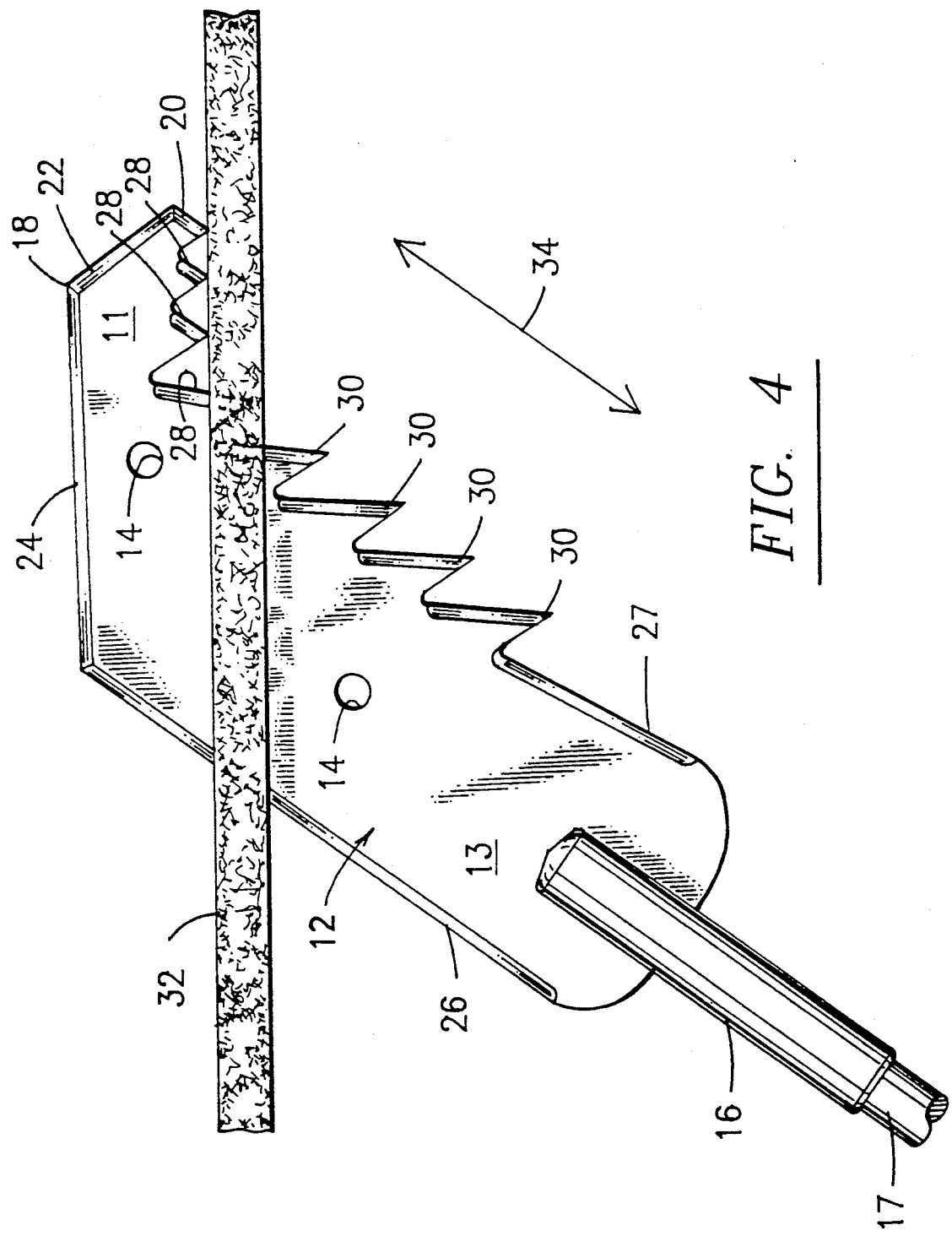
FIG. 4 is a perspective view of the tool when being used to remove a ceiling panel.

To use the novel tool, the firefighter penetrates ceiling 32 or other structural panel with piercing point 18 and performs the sawing action indicated in FIG. 4 by the double-headed directional arrow 34; tests of the invention have shown that large areas of ceiling can be quickly removed. Significantly, the removal process is conducted more efficiently than is possible with the common pike hook, because removal is accomplished with a single penetration. The weight-supporting teeth 28 help support the tool after the penetration has taken place so that the firefighter is not as exhausted after ripping out large sections of ceiling materials as said firefighter would be if a pike hook had been used.

By enabling the firefighter to uncover the source of the fire in a more efficient manner, the novel tool saves lives as well as property. The tool also has utility in opening walls, floors, and other structural panels in automobiles, mobile homes, and other structures. More particularly, it easily pierces, cuts, and pulls sheetrock (drywall), plaster, sheet metal, and similar materials.

This invention is clearly new and useful. Moreover, it was not obvious to those of ordinary skill in this art at the time it was made, in view of the prior art when considered as a whole in accordance with the requirements of law.

The novel tool may be used not only during a fire, but it may also be used in the construction trade after a fire, or as part of the overhaul procedure conducted by the fire department immediately after a fire. Other applications may be found for the tool as well.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described,

What is claimed is:

1. A tool for piercing through and sawing structural panels, comprising:
    a flat blade member;
    an elongate handle member having a distal end to which a proximal end of said blade member is fixedly secured, said handle member having a length sufficient to enable an individual standing on a floor to employ the tool against an overhead ceiling;
    said blade member including a slicing edge, a sawing edge, and a piercing edge, said slicing and sawing edges being positioned on opposite sides of a longitudinal axis of said handle and said piercing edge being positioned between said slicing and sawing edges at a distal end of said blade member;
    said piercing edge including a piercing point;
    said slicing edge being disposed parallel to said longitudinal axis of said handle member on a first side thereof;
    said sawing edge having a plurality of teeth members formed therein;
    said plurality of teeth members including a plurality of weight-supporting teeth members and a plurality of saw teeth members;
    said weight-supporting teeth members being disposed at a predetermined acute angel relative to said longitudinal axis;
    said saw teeth members being disposed substantially parallel to said longitudinal axis on a second side thereof;
    said piercing edge including a first part disposed at a predetermined acute angle relative to said longitudinal axis, said first part extending from said slicing edge to said piercing point; and
    said piercing edge including a second part disposed at a predetermined obtuse angle with resect to said first part of said piercing edge, said second part extending from said sawing edge to said piercing point, said first and second parts of said piercing edge defining said piercing point where said first and second parts converge.

2. The tool of claim 1, wherein said weight-supporting teeth, said saw teeth, and said blade member are coplanar with one another.

3. The tool of claim 2, wherein said weight-supporting teeth members and said saw teeth members are skewed at a predetermined angle with respect to said blade member 4. The tool of claim 3, wherein alternate members of said weight-supporting and saw teeth members are skewed in a common, first direction with respect to said blade member and wherein alternate members of said weight-supporting and saw teeth members are skewed in a common, second direction differs from said first direction with respect to said blade member.

5. The tool of claim 1, wherein the predetermined acute angle of said weight-supporting teeth members is about forty two degrees.

6. The tool of claim 5, further comprising a milled cutting edge formed in said blade member between said saw teeth members and said proximal end of said blade member.

* * * * *